United States Patent
Komoto

(10) Patent No.: US 6,836,459 B2
(45) Date of Patent: Dec. 28, 2004

(54) OPTICAL PICKUP DEVICE

(75) Inventor: Hiraku Komoto, Ehime (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 683 days.

(21) Appl. No.: 09/899,064

(22) Filed: Jul. 6, 2001

(65) Prior Publication Data

US 2002/0018407 A1 Feb. 14, 2002

(30) Foreign Application Priority Data

Aug. 2, 2000 (JP) ....................................... 2000-233818

(51) Int. Cl.⁷ ................................................. G11B 7/00
(52) U.S. Cl. ................................................. 369/112.23
(58) Field of Search ........................... 369/44.14, 44.15, 369/44.16, 112.23, 112.25

(56) References Cited

U.S. PATENT DOCUMENTS 4,775,967 A * 10/1988 Shimada et al. ......... 369/44.26

FOREIGN PATENT DOCUMENTS

| JP | 60-151603 | 8/1985 |
|---|---|---|
| JP | 62-7018 | 1/1987 |
| JP | 5-47011 | 2/1993 |
| JP | 5-53089 | 3/1993 |
| JP | 3047082 | 3/1993 |
| JP | 5-249307 | 9/1993 |
| JP | 7-162051 | 6/1995 |
| JP | 10-39122 | 2/1998 |
| JP | 10-269599 | 10/1998 |
| JP | 11-14918 | 1/1999 |
| JP | 11-72605 | 3/1999 |
| JP | 11-133210 | 5/1999 |

* cited by examiner

Primary Examiner—Paul W. Huber
(74) Attorney, Agent, or Firm—Wenderoth, Lind & Ponack, L.L.P.

(57) ABSTRACT

An optical pickup device for irradiating a disk type data recording medium with a laser beam emitted from a light source, comprises: an object lens comprising a transparent piezoelectric element that deforms when a voltage is applied, and condensing the laser beam emitted from the light source to apply it onto the data recording layer; and a control circuit for controlling the position of focus of the laser beam by applying a voltage to the object lens to deform the object lens. In the optical pickup device so constructed, focusing and tracking adjustment can be electrically carried out, and a mechanism for driving the object lens in the focusing direction and a mechanism for driving the optical pickup in the tracking direction are dispensed with. Therefore, the time required for focusing and tracking is reduced, and the weight of the device is reduced, resulting in speedup and energy saving.

8 Claims, 11 Drawing Sheets

OPTICAL PICKUP DEVICE

FIELD OF THE INVENTION

The present invention relates to an optical pickup device for recording or reproducing data on/from optical disks.

BACKGROUND OF THE INVENTION

In recent years, optical disks capable of storing enormous amounts of data at high density have been used in various fields. Optical disks are optical data storage mediums characterized by the capabilities of non-contact data recording or reproduction, and medium interchange. Especially, optimal disks have received attention as external storage mediums for optical disk files or computers.

On optical disks, data are recorded or reproduced by an optical pickup using a semiconductor laser or the like, and the recorded data can be erased and rewritten on some optical disks.

FIG. 21 is a schematic diagram illustrating the structure of a conventional optical pickup device 500. The optical pickup device 500 is provided with a data recording/reproduction means 502, and a driving means 512 for driving the data recording/reproduction means 502. The data recording/reproduction means 502 is provided with a light source holder for recording or reproducing data on/from a disk type recording medium 511 that rotates about an axis 510, and a fine-adjustment means 504 for finely adjusting the position of the light source holder 503. The light source holder 503 is provided with a laser beam emission/reception means 515, a reflection mirror 505, an object lens 506, an object lens holder 507, and an object lens position adjustment means 508.

The data recording/reproduction means 502 is driven, by the driving means 512, in the direction of the radius of the recording medium 511, and records or reproduces data on/from an arbitrary area of the recording medium 511. The laser beam emission/reception means 515 emits a laser beam 519, and receives the laser beam 519 reflected at the recording medium 511. The reflection mirror 505 is a plane mirror that reflects the laser beam 519. The object lens 506 converges the laser beam 519 reflected by the reflection mirror 505, onto the signal recording surface of the recording medium 511. The object lens holder 507 holds the object lens 506. The object lens position adjustment means 509 drives the object lens holder 507 in the direction perpendicular to the data recording surface of the recording medium 511 so as to bring the laser beam 519 into a focus on the signal recording layer of the recording medium 511.

In the optical pickup device 500 so constructed, except for an auxiliary laser beam for track servo, a single laser beam 519 is focused on a single recording track on the recording medium 511, and reading/writing of data from/into the signal recording track is carried out at one time. In this case, since the recording rate or reproduction rate of the optical pickup device 500 to the recording medium 511 depends on the rotation speed of the optical disk, the recording medium 511 must be rotated at a high speed to increase the recording rate or reproduction rate. Therefore, prevention of vibrations caused by that the recording medium 511 is out of balance, and speedup in signal processing are desired.

FIG. 22 is a schematic diagram illustrating a conventional optical pickup device 501 that can perform reading or writing of data from/into plural recording tracks at the same time. In FIG. 22, the same reference numerals as those shown in FIG. 21 denote the same or corresponding parts. The light source holder 503 further includes a diffraction grating 509 and a diffraction grating adjustment means 515. The diffraction grating 509 splits the laser beam 519 into plural laser beams 514 that are nearly parallel to each other. The diffraction grating adjustment means 515 finely adjusts the diffraction grating 509 so that splitting of the laser beam 519 is appropriately carried out.

As described above, in the optical pickup device 501 shown in FIG. 22, the diffraction grating 509 splits the laser beam 519 into the nearly-parallel laser beams 514, and data are read or written from/into plural recording tracks at the same time using the laser beams 514, whereby high-speed reading/writing is achieved without increasing the rotation speed of the recording medium 511. A birefringence material may be used instead of the diffraction grating 509.

In the conventional optical pickup device 500 or 501, the focal length in the focusing direction and the focal direction in the tracking direction must be controlled by the object lens adjustment means 508 and the fine-adjustment means 504, respectively, to bring the laser beam 519 into a focus on the data recording layer of the optical disk 511. Especially in an optical disk recording apparatus or an optical disk reproduction apparatus that is applicable to both a DVD (Digital Versatile Disk) and a CD (Compact Disk), since the position of a data a recording layer in a recording medium in the vertical direction of the medium (hereinafter referred to as "depth position") differs between the DVD and the CD due to the difference in their standards, the object lens adjustment means 508 is necessary to bring a laser beam into focuses on the respective data recording layers of the DVD and the CD. Therefore, mechanical driving by the object lens adjustment means 508 and the fine-adjustment means 504 is necessary to control the position of the focus of the laser beam, and excess time and energy for the mechanical driving are required.

Further, in order to bring a laser beam into focuses on the data recording layers of the DVD and the CD, a double-focus lens that can bring a laser beam into the respective focuses may be employed as an object lens, instead of the object lens adjustment means 508. In this case, however, a signal from one focus is inputted as noise to a signal from the other focus, resulting in degraded signal quality.

Further, in order to record or reproduce data on/from an arbitrary area of the data recording medium 511, the data recording/reproduction means having a weight including the weights of the object lens adjustment means 508 and the fine-adjustment means 504 must be driven by the driving means 512. Therefore, excess time and energy are required for driving the data recording/reproduction means 502.

Furthermore, in the conventional optical pickup device 501, when plural laser beams are emitted, the intervals of focuses of the respective laser beams are fixed by the physical arrangement of the respective constituents, or it is only possible to change the intervals of focuses of all laser beams 514 at the same time by the diffraction grating 509. Accordingly, for example, in a three-beam system optical pickup device, although two beams can be brought into focuses on recording tracks, the focus position of the third beam alone cannot be controlled independently. In some cases, reading of data by the third beam cannot be carried out unless using a technique that can read data even when the focus of the beam is not positioned on the recording track, such as an image sensor or the like.

SUMMARY OF THE INVENTION

The present invention is made to solve the above-mentioned problems and has for its object to provide an optical pickup device that realizes speedup and energy saving in driving the data recording/reproduction means with the driving means by reducing the weight of the data recording/reproduction means, that realizes speedup and energy saving in controlling the position of focus of a laser beam by performing the control without using mechanical driver, and that is able to adjust the positions of focuses of plural laser beams independently.

Other objects and advantages of the invention will become apparent from the detailed description that follows. The detailed description and specific embodiments described are provided only for illustration since various additions and modifications within the scope of the invention will be apparent to those of skill in the art from the detailed description.

According to a first aspect of the present invention, there is provided an optical pickup device for irradiating a data recording layer of a disk type data recording medium with a laser beam emitted from a light source, comprising: an object lens comprising a transparent piezoelectric element that deforms when a voltage is applied, and condensing the laser beam emitted from the light source to apply it onto the data recording layer; and control means for controlling the position of focus of the laser beam by applying a voltage to the object lens to deform the object lens. In the optical pickup device so constructed, focusing of the laser beam and tracking can be electrically carried out, and a mechanism for driving the object lens in the focusing direction and a mechanism for driving the optical pickup in the tracking direction are dispensed with. Therefore, the time for focusing the laser beam and the time for tracking are reduced, and the weight of the device is reduced and, furthermore, the energy consumption is reduced as compared with the case where a mechanical driver is employed, resulting in an optical pickup device with a simplified driving mechanism, that realizes speedup and energy saving in focusing and tracking.

According to a second aspect of the present invention, there is provided an optical pickup device for irradiating a data recording layer of a disk type data recording medium with a laser beam emitted from a light source, comprising: an object lens that is deformable by a force applied from the outside, and converges the laser beam emitted from the light source to apply it onto the data recording layer; a piezoelectric element that deforms when a voltage is applied, and then applies a force to the object lens; and a control means for controlling the position of focus of the laser beam by applying a voltage to the piezoelectric element to deform the piezoelectric element so that the object lens is deformed by a force applied from the deformed piezoelectric element. In the optical pickup device so constructed, focusing of the laser beam and tracking can be electrically carried out, and a mechanism for driving the object lens in the focusing direction and a mechanism for driving the optical pickup in the tracking direction are dispensed with. Therefore, the time for focusing the laser beam and the time for tracking are reduced, and the weight of the device is reduced and, furthermore, the energy consumption is reduced as compared with the case where a mechanical driver is employed, resulting in an optical pickup device with a simplified driving mechanism, that realizes speedup and energy saving in focusing and tracking.

According to a third aspect of the present invention, in the above-mentioned optical pickup device, when a plurality of disk type data recording mediums having data recording layers of different depth positions are employed, said control means controls the position of focus of the laser beam by deforming the object lens so that the laser beam is focused on each of the data recording layers. In the optical pickup device so constructed, an object lens driving mechanism and a double-focus lens, which have conventionally been required for hocusing the laser beam on the data recording layers of the respective data recording mediums, are dispensed with. Therefore, the time for focusing the laser beam and the time for tracking are reduced, and the weight of the device is reduced and, furthermore, the energy consumption is reduced as compared with the case where a mechanical driver is employed, resulting in an optical pickup device with a simplified driving mechanism, that realizes speedup and energy saving in focusing and tracking.

According to a fourth aspect of the present invention, there is provided an optical pickup device for reproducing signals from a data recording layer of a disk type data recording medium, or reproducing and recording signals from/into the data recording layer, using a laser beam emitted from a light source, and this optical pickup device comprises: a concave reflection mirror as a deformable concave mirror, for reflecting the laser beam; at least one piezoelectric element for deforming the concave reflection mirror; and a piezoelectric element control circuit for controlling the position of focus of the laser beam by applying a voltage to the piezoelectric element to deform the concave reflection mirror. In the optical pickup device so constructed, the laser beam can be focused on the recording medium, and the position of the focus can be finely adjusted in the focusing direction and the tracking direction, without using an object lens, an object lens holder, an object lens adjustment means, and a tracking direction fine-adjustment means. Accordingly, it is not necessary to provide the data recording/reproduction means with an object lens, an object lens holder, an object lens adjustment means, and a tracking direction fine-adjustment means and, further, the piezoelectric element control circuit can be disposed outside the data recording/reproduction means, whereby the weight of the data recording/reproduction means is reduced. This weight reduction leads to weight reduction of the part to be driven by the driving means, resulting in reduced power consumption and high-speed operation. Further, since fine adjustment of the focus position in the focusing direction and the tracking direction can be performed by applying a voltage from the piezoelectric element control circuit to the piezoelectric element, the driving mechanism such as the focus position fine-adjustment means is reduced, resulting in high-speed adjustment of focus position and reduced power consumption.

According to a fifth aspect of the present invention, there is provided an optical pickup device for reproducing signals from a data recording layer of a disk type data recording medium, or reproducing and recording signals from/into the data recording layer, using a laser beam emitted from a light source, and this optical pickup device comprises: a concave reflection mirror as a deformable concave mirror, comprising a concave piezoelectric element, a conductive coating applied to the inner surface of the piezoelectric element, reflecting the laser beam, and having electrical conductivity, and plural electrodes disposed on the outer surface of the piezoelectric element; and a piezoelectric element control circuit for controlling the position of focus of the laser beam by applying voltages between the conductive coating and the plural electrodes to deform the concave piezoelectric element so that the concave reflection mirror is deformed. In the optical pickup device so constructed, the laser beam can be focused on the recording medium, and the position of the focus can be finely adjusted in the focusing direction and the tracking direction, without using an object lens, an object lens holder, an object lens adjustment means, and a tracking direction fine-adjustment means. Accordingly, it is not necessary to provide the data recording/reproduction means with an object lens, an object lens holder, an object lens adjustment means, and a tracking direction fine-adjustment means and, further, the piezoelectric element control circuit can be disposed outside the data recording/reproduction means, whereby the weight of the data recording/reproduction means is reduced. This weight reduction leads to weight reduction of the part to be driven by the driving means, resulting in reduced power consumption and high-speed operation. Further, since fine adjustment of the focus position in the focusing direction and the tracking direction can be performed by applying a voltage from the piezoelectric element control circuit to the piezoelectric element, the driving mechanism such as the focus position fine-adjustment moans is reduced, resulting in high-speed adjustment of focus position and reduced power consumption. Moreover, since the concave reflection mirror itself deforms, the focus position can be controlled in a wide range.

According to a sixth aspect of the present invention, in the above-mentioned optical pickup device, when a plurality of disk type data recording mediums having data recording layers of different depth positions are employed, said piezoelectric element control circuit controls the position of focus of the laser beam by deforming the concave reflection mirror so that the laser beam is focused on each of the data recording layers of the respective disk type data recording mediums. Therefore, a mechanical system, which has conventionally been required for focusing the laser beam on the data recording surface of each data recording medium is dispensed with, and the weight of the data recording/reproduction means is reduced, whereby the weight of the part to be driven by the driving means is reduced, resulting in reduced power consumption and high-speed operation.

According to a seventh aspect of the present invention, in the above-mentioned optical pickup device, the concave reflection mirror generates plural focuses of the laser beam. Therefore, the optical pickup device can read data simultaneously from plural recording tracks on the recording medium without using an image sensor or the like. Further, since the optical pickup device can generate a single laser focus, it can be applied to, for example, writing of data into a recordable medium such as a CD-R. Furthermore, when a single wide laser beam is used, influences of the boundaries between the respective focuses of the concave reelection mirror are reduced.

According to an eighth aspect of the present invention, in the above-mentioned optical pickup device, the plural focuses of the laser beam generated by the concave reflection mirror are independently applied to plural tracks of the disk type data recording medium. Therefore, the optical pickup device can read data simultaneously from plural recording tracks on the recording medium without using an image sensor or the like.

DETAILED DESCRIPTION OF THE PREFERRED EMBODIMENTS

[Embodiment 1]

Figure 1:
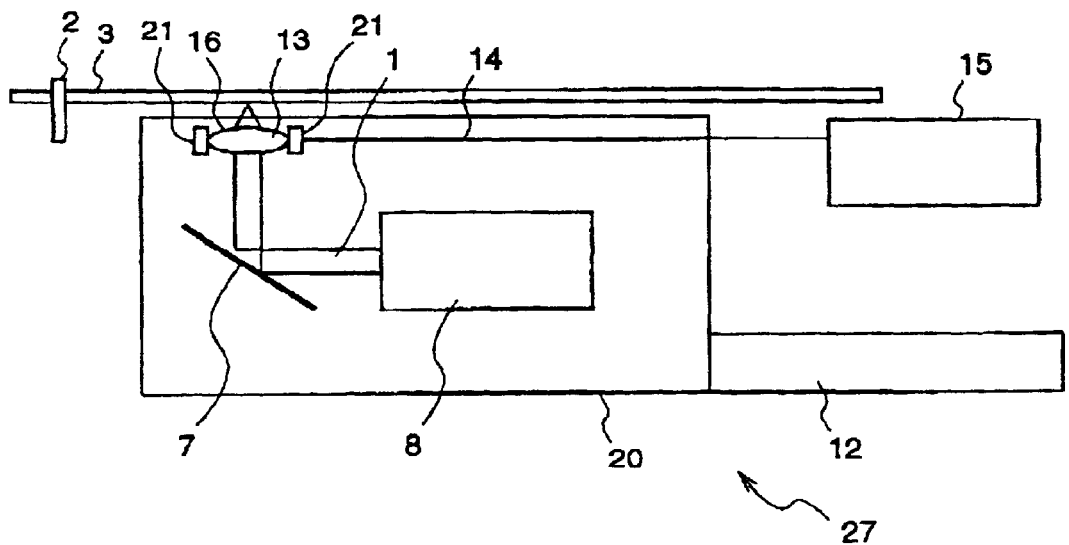
FIG. 1 is a schematic diagram illustrating the structure of an optical pickup device according to a first embodiment of the present invention.

FIG. 1 is a schematic diagram illustrating the structure of an optical pickup device 27 according to a first embodiment of the present invention. The optical pickup device 27 is provided with a data recording/reproduction means 20, a control circuit 15, and a driving means 12. The data recording/reproduction means 20 comprises, for example, a transparent piezoelectric element such as crystal. The data recording/reproduction means 20 is provided with an object lens 13, plural transparent electrodes 16, a laser beam emission/reception means 8, and a reflection mirror 7. The shape of the object lens 13 varies according to an electric field applied thereto. The plural transparent electrodes 16 are disposed on the surface of the object lens 13, and apply voltages to the object lens 13. The laser beam emission/reception means 8 irradiates an optical disk (recording medium) 3 with a laser beam 1 through the object lens 13, and receives the return beam from the optical disk 3 through the object lens 13 to obtain a reproduced signal from the return beam. The reflection mirror 7 reflects the beam emitted from the laser beam emission/reception means 8 to the object lens 13, and reflects the return beam obtained through the object lens 13 to the laser beam emission/reception means 8. Instead of the laser beam emission/reception means 8, a light source for emitting a laser beam and a reception means for receiving a return beam may be provided separately. The transparent electrodes 16 are connected to the control circuit 15 that is disposed outside the data recording/reproduction means 20, through a control signal line 14 and an object lens holder 21 having contacts to the transparent electrodes 16. The control circuit 15 applies a voltage to the transparent electrodes 16 through the control signal line 14 to apply the voltage to the object lens 13, and adjusts the voltage to control the electric field applied to the object lens 13. Thereby, the control circuit 15 controls the focal length of the object lens 13 in the focusing direction, and the focal direction of the object lens 13 in the tracking direction. The focusing direction is the direction perpendicular to the data recording surface of the optical disk 3, and the tracking direction is the direction of the radius of the optical disk 3, that is, the direction of a straight line connecting the center of the optical disk 3 with the outer circumference. The position of the object lens 13 is fixed in the data recording/reproduction means 20. The optical disk 3 is opposed to the object lens 13 at a predetermined interval, with the rotation axis 2 in the center. The driving means 12 drives the data recording/reproduction means 20 in the direction along which tracks are arranged on the optical disk 3.

Figure 5:
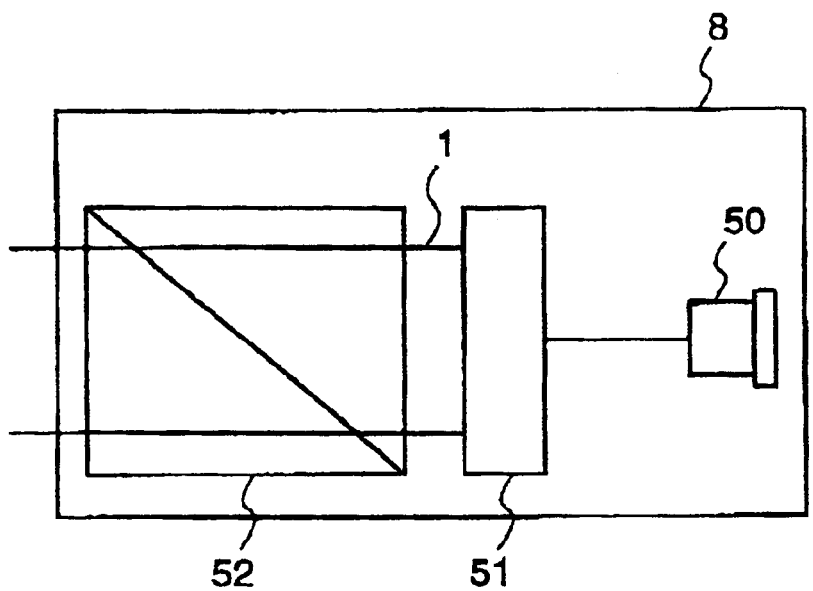
FIG. 5 is a diagram illustrating the structure of a laser beam emission/reception means of the optical pickup device according to the first embodiment.

FIG. 5 is a schematic diagram illustrating the internal structure of the laser beam emission/reception means 8. With reference to FIG. 5, the laser beam emission/reception means 8 is provided with a laser diode 50, a laser beam diameter conversion unit 53, and a photodetector 52. The laser diode 50 outputs a laser beam 1 of a predetermined wavelength. The laser beam diameter conversion unit 51 changes the diameter of the laser beam 1 outputted from the laser diode 50, and outputs the laser beam 1. The photodetector 52 receives the return beam from the optical disk, and converts the beam into an electric signal to obtain a reproduced signal. The laser beam emission/reception means 8 may have other structure than mentioned above so long as it can emit and receive a laser beam. For example, the laser beam emission/reception means 8 may be provided with two or more laser diodes that output laser beams of different wavelengths, and one of these laser beams may be selected as required.

Next, a description will be given of the operation of the optical pickup device 27 according to the first embodiment of the invention. The optical pickup device 27 is driven by the driving means 12 in the direction of the radius of the optical disk 3, that is, in the direction of a straight line connecting the center of the optical disk 3 with the outer circumference, and records or reproduces data in/from an arbitrary area of the optical disk 3. The laser beam outputted from the laser beam emission/reception means 8 is applied to a predetermined track on the data recording layer of the optical disk 3 through the mirror 7 and the object lens 13. The return beam from the data recording layer is input to the laser beam emission/reception means 8 through the object lens 13 and the mirror 7, and a reproduced signal is obtained on the basis of the received return beam.

Figure 3:
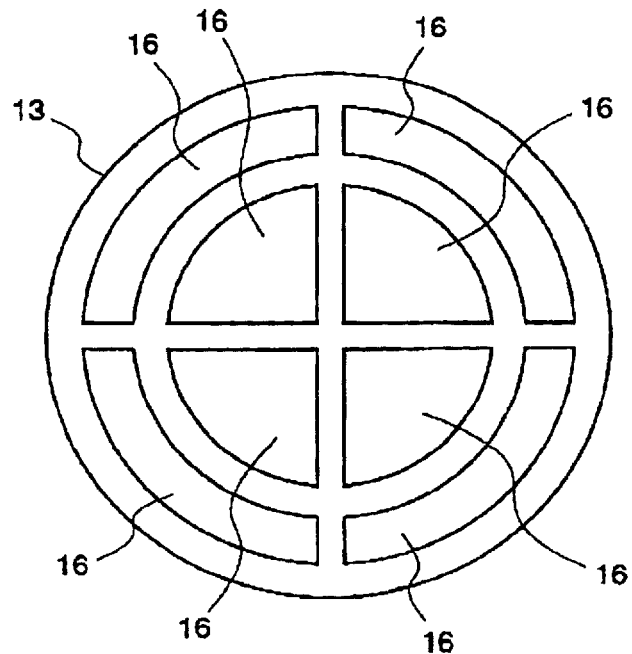
FIG. 3 is a plan view for explaining the structure of an object lens of the optical pickup device according to the first embodiment.

FIG. 3 is a plan view illustrating the structure of the object lens 13. The plural transparent electrodes 16 are formed by coating on the surface of the object lens 13 so that each electrode 16 has a predetermined plane pattern, and these electrodes 16 are connected to the control signal line 14 although it is not shown in FIG. 3. The respective transparent electrodes 16 may have any plane patterns so long as the electric field applied to the object lens 13 can be easily controlled.

In the optical pickup device 27, the object lens 13 comprises a transparent piezoelectric element, and its surface is coated with the transparent electrodes 16 as shown in FIG. 3. By varying the voltage applied to the transparent electrodes 16, an electric field according to the voltage is applied to the object lens 13, and the shape of the object lens 13 varies according to the electric field, whereby the focal length and the focal direction vary. In this way, the position of the focus can be varied.

Therefore, in order to bring the beam, which is applied to the data recording layer of the optical disk 3 through the object lens 13, into a focus or, the data recording layer, the voltage applied from the control circuit 15 to each of the respective transparent electrodes 16 is adjusted to control the voltage applied to the object lens 13, whereby the object lens is deformed such that its thickness is varied. As they result, the focal length is varied, and focusing is achieved.

Further, when it is necessary to finely adjust tracking of the laser beam that is applied to the data recording layer of the optical disk 3 through the object lens 13, the voltage applied to the transparent electrodes 16 is adjusted so that it is applied asymmetrically with respect to the center of the object lens 13, whereby the electric field applied to the object lens 13 is controlled so that it becomes asymmetrical with respect to the center of the object lens 13. As the result, the object lens 13 is deformed asymmetrically, and the focal direction, i.e., the direction connecting the center of the lens with the focus, is varied, whereby tracking is adjusted so that the focus is accurately positioned on the track on the data recording layer of the optical disk 3.

Figure 2:
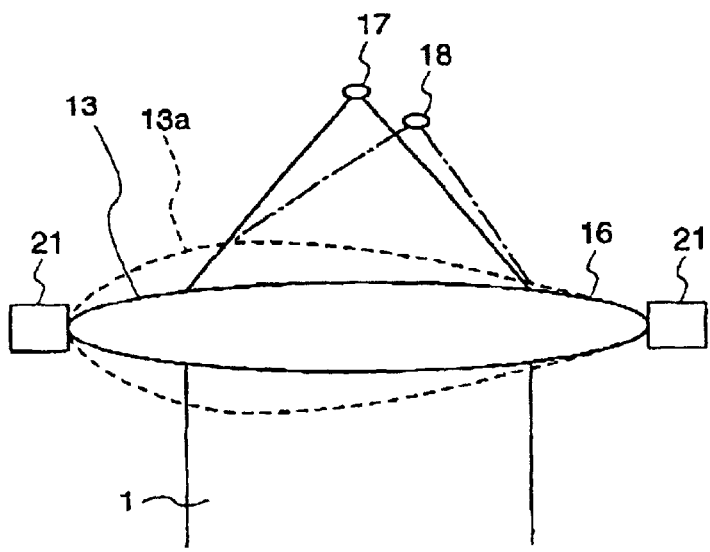
FIG. 2 is a diagram for explaining the operation of the optical pickup device according to the first embodiment.

For example, as shown in FIG. 2, the voltage supplied from the control circuit 15 to the transparent electrodes 16 is adjusted to control the voltage applied to the object lens 13, whereby the object lens 13 is deformed such that its thickness is increased and it becomes asymmetrical with respect to the center, as shown by 13a. Thereby, the focus position of the object lens 13, which is obtained with respect to the incident laser beam 1, is changed from the focus position 17 when the object lens 13 is not deformed, to the focus position 18.

As the result, focusing and tracking adjustment are electrically controlled by controlling the voltage applied from the control circuit 15 to the transparent electrodes 16 to vary the focus position of the object lens 13.

As described above, according to the optical pickup device of the first embodiment, since the object lens 13 comprising a transparent piezoelectric element is deformed by applying a voltage from the control circuit to the object lens 13 itself, focusing and tracking adjustment can be electrically controlled. Therefore, in contrast with the conventional optical pickup device, it is not necessary to provide the optical pickup device with mechanical systems, such as a focus driving mechanism that drives the object lens for focusing, and a tracking mechanism that drives the optical pickup for fine adjustment of tracking. As the result, the driving mechanism is simplified, and the weight of the optical pickup is reduced.

Further, since focusing and tracking adjustment can be electrically performed in an instant, it is not necessary to mechanically drive the lens and the like as in the conventional device, whereby the time required for focusing and tracking is reduced.

Moreover, since only object lens 13 is electrically deformed, energy saving is achieved as compared with the conventional device that operates the driving mechanism.

While in this first embodiment an optical disk is used as an optical data recording medium, the optical pickup device according to this first embodiment may be used for writing or reading of data in/from other disk type optical data recording mediums than the optical disk, with the same effects as described above.

[Embodiment 2]

Figure 4:
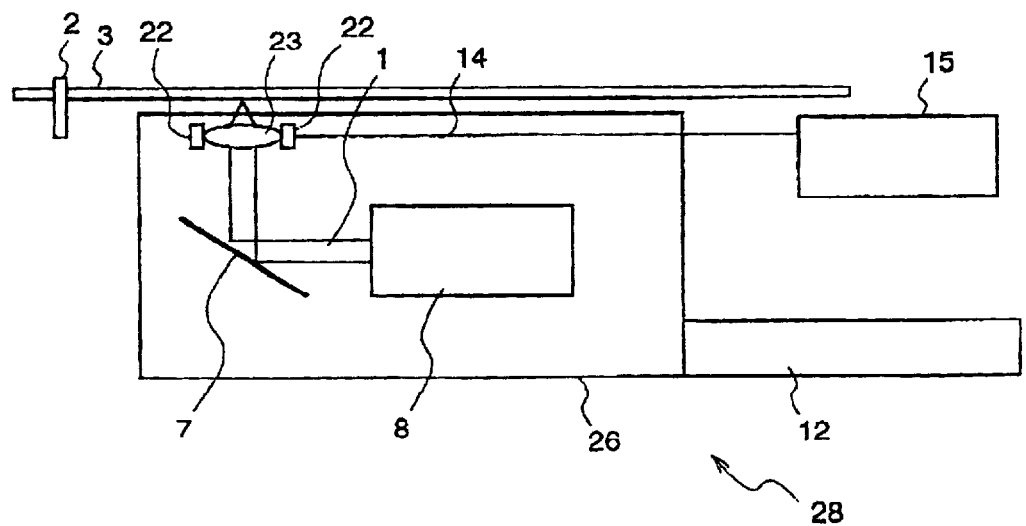
FIG. 4 is a schematic diagram illustrating the structure of an optical pickup device according to a second embodiment of the present invention.

FIG. 4 is a schematic diagram illustrating the structure of an optical pickup device 28 according to a second embodiment of the present invention. In FIG. 4, the same reference numerals as those shown in FIG. 1 denote the same or corresponding elements. In the optical pickup device 28, a data recording/reproduction means is provided with an object lens 23 comprising a transparent material which is deformable by a force applied from the outside, and piezoelectric elements 22 connected to the control signal line 14 are disposed surrounding the object lens 23.

In the optical pickup device 28 of this second embodiment, when a voltage is applied from the control circuit 15 through the control signal line 14 to the piezoelectric elements 22, the piezoelectric elements 22 are deformed. Thereby, a force is applied from the piezoelectric elements 22 to the object lens 23, and the object lens 23 is deformed. As the object lens 23 is deformed, the focal length in the focusing direction, the focal direction in the tracking direction, and the like are changed, whereby the position of the focus is changed.

Therefore, in order to bring the laser beam, which is applied to the data recording layer of the optical disk 3 through the object lens 23, into a focus on the data recording layer, the voltage applied from the control circuit 15 to the piezoelectric elements 22 is adjusted to control the force applied from the piezoelectric elements to the object lens 23, whereby the shape of the object lens 23, for example, the thickness, is varied. As the result, the focal length is varied, and focusing is achieved.

Further, when it is necessary to finely adjust tracking of the laser beam that is applied to the data recording layer of the optical disk 3 through the object lens 23, the voltage applied to the piezoelectric elements 22 is adjusted so that it is applied asymmetrically with respect to the center of the object lens 23, whereby the force applied from the piezoelectric elements 22 to the object lens 23 is controlled so that it is applied asymmetrically with respect to the center of the object lens 23. Thus, the object lens 23 is deformed asymmetrically, and the focal direction, i.e., the direction connecting the center of the lens with the focus, is varied, whereby tracking is adjusted so that the focus is accurately positioned on the track on the data recording layer of the optical disk 3.

As described above, according to the second embodiment of the invention, focusing and tracking adjustment can be electrically controlled by adjusting the voltage applied from the control circuit 15 to the piezoelectric elements 22 to vary the focus position of the object lens 23.

In this second embodiment, the number, shape, and arrangement of the piezoelectric elements 22 may be arbitrarily selected so long as deformation of the object lens 23 can be accurately controlled. For example, the object lens 23 may be held by four lens-holder-shaped piezoelectric elements from all directions, or a plurality of transparent thin-film piezoelectric elements may be adhered to the surface of the object lens 23.

[Embodiment 3]

Figure 6:
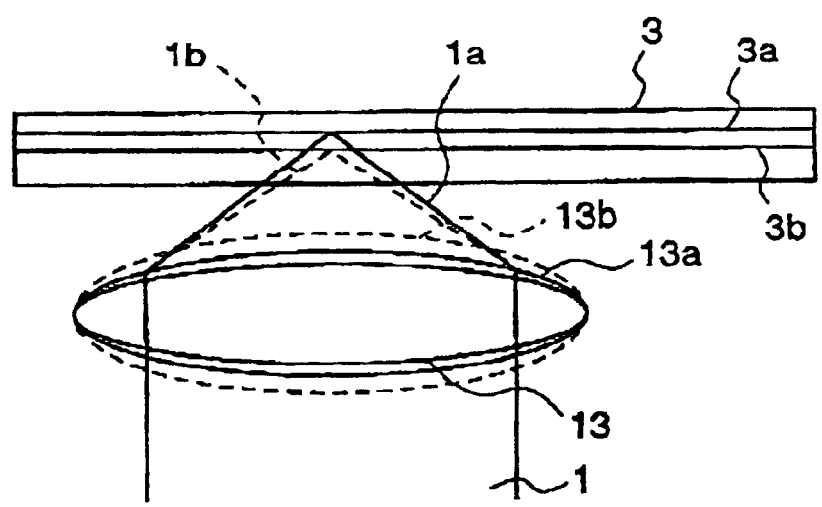
FIG. 6 is a diagram for explaining an optical pickup device according to a third embodiment of the present invention.

FIG. 6 is a schematic diagram illustrating the structure of a main part of an optical pickup device according to a third embodiment of the present invention. The optical pickup device according to the third embodiment is different from the optical pickup device according to the first embodiment only in that, when the optical disk 3 is a CD or a DVD, the object lens 13 is deformed using the control circuit 15 so that the laser beam 1 is focused on a data recording layer 3a for CD or on a data recording layer 3b for DVD, respectively. In FIG. 6, reference numeral 13a denotes the object lens 13 that is deformed so that the emitted laser beam 1a is focused on the data recording layer 3a for CD, and reference numeral 13b denotes the object lens 13 that is deformed so that the emitted laser beam 1b is focused on the data recording layer 3b for DVD.

Next, the operation will be described. Since the operation of the optical pickup device other than the part relating to control of the object lens 13 to adjust the focus of the laser beam 1 is identical to that already described for the first embodiment, repeated description is not necessary.

Initially, when the optical disk is a CD, the control circuit 15 varies the voltage applied to the object lens 13 to deform the object lens 13 so that it has the shape shown by 13a. Thereby, the focus of the laser beam 1a converged by the object lens 13a is positioned on the data recording layer 3a for CD.

When the optical disk is a DVD, the control circuit 15 varies the voltage applied to the object lens 13 to deform the object lens 13 so that it has the shape shown by 13b. Thereby, the focus of the laser beam 1b converged by the object lens 13b is positioned on the data recording layer 3b for DVD.

The position of the focus when the object lens 13 is not deformed may be set on either the data recording layer 3a for CD or the data recording layer 3b for DVD.

As described above, according to the third embodiment of the invention, the laser beam can be focused on the data recording layer 3a for CD and on the data recording layer 3b for DVD as desired by controlling the object lens 13 with the control circuit 15. Therefore, it is not necessary to provide the data recording/reproduction means with a double-focus object lens or an object lens driving mechanism for switching the data recording layer, and the weight or the data recording/reproduction means is reduced. Further, the weight reduction of the data recording/reproduction means leads to weight reduction of the part to be driven by the driving means 12, resulting in reduced power consumption and high-speed operation.

[Embodiment 4]

Figure 7:
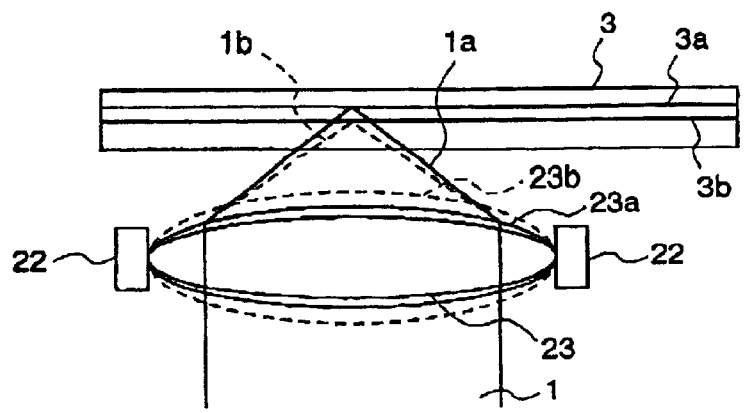
FIG. 7 is a diagram for explaining an optical pickup device according to a fourth embodiment of the present invention.

FIG. 7 is a schematic diagram illustrating the structure of a main part of an optical pickup device according to a fourth embodiment of the present invention. The optical pickup device according to the fourth embodiment is different from the optical pickup device according to the second embodiment in that, when the optical disk 3 is a CD or a DVD, the object lens 23 is deformed by controlling the piezoelectric elements 22 with the control circuit 15 so that the laser beam 1 is focused on a data recording layer 3a for CD or on a data recording layer 3b for DVD, respectively. In FIG. 7, reference numeral 23a denotes the object lens 23 that in deformed so that the emitted laser beam 1a is focused on the data recording layer 3a for CD, and reference numeral 23b denotes the object lens 23 that is deformed so that the emitted laser beam 1b is focused on the data recording layer 3b for DVD.

Next, the operation will be described. Since the operation of the optical pickup device other than the part relating to control of the object lens 23 to adjust the focus of the laser beam 1 is identical to that already described for the second embodiment, repeated description is not necessary.

When the optical disk 3 is a CD, the control circuit 15 varies the voltage applied to the piezoelectric elements 22 to deform the piezoelectric elements 22. The deformation of the piezoelectric elements 22 applies a force to the object lens 23, whereby the object lens 23 is deformed so that it has the shape shown by 23a. The laser beam 1 converged by the deformed object lens 23a is focused on the data recording layer 3a for CD.

When the optical disk 3 is a DVD, the control circuit 15 varies the voltage applied to the piezoelectric elements 22 to deform the piezoelectric elements 22. The deformation of the piezoelectric elements 22 applies a force to the object lens 23, whereby the object lens 23 is deformed to the shape of the object lens 23b. The laser beam 1 converged by the deformed object lent 23b is focused on the data recording layer 3b for DVD.

The position of the focus when the object lens 23 is not deformed may be set on either the data recording layer 3a for CD or the data recording layer 3b for DVD.

As described above, according to the fourth embodiment of the invention, since the laser beam can be focused on the data recording layer 3a for CD and on the data recording layer 3b for DVD as desired by controlling the piezoelectric elements 22 with the control circuit 15. Therefore, it is not necessary to provide the data recording/reproduction means with a double-focus object lens or an object lens driving mechanism for switching the data recording layer, and the weight of the data recording/reproduction means is reduced. Further, the weight reduction of the data recording/reproduction means leads to weight reduction of the part to be driven by the driving means 12, resulting in reduced power consumption and high-speed operation.

In the optical pickup device according to the third or fourth embodiment of the invention, the laser beam emission/reception means 8 may be provided with plural laser diodes capable of outputting plural laser beams having different wavelengths, and one of the plural laser beams with different wavelengths may be selected as the laser beam 1. Also in this case, the same effects as those described for the third and fourth embodiments are achieved. For example, when the optical disk is a CD or a DVD, a laser beam for CD or a laser beam for DVD can be applied to the data recording layer corresponding to the optical disk, respectively.

Further, while in the third and fourth embodiments an optical pickup device using a DC and a DVD as optical disks is described, the present invention is also applicable to an optical pickup device that uses plural disks having data recording layers of different depth positions. Also in this case, the same effects as those described for the third and fourth embodiments are achieved.

[Embodiment 5]

Figure 8:
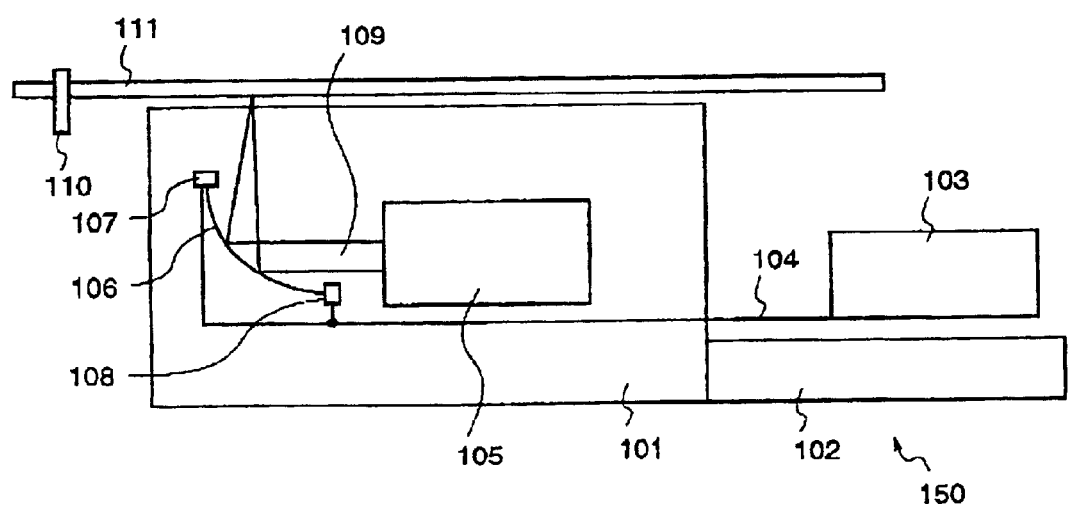
FIG. 8 is a schematic diagram illustrating an optical pickup device according to a fifth embodiment of the present invention.

FIG. 8 is a schematic diagram illustrating the structure of an optical pickup device 150 according to a fifth embodiment of the present invention. The optical pickup device 150 is provided with a data recording/reproduction means 101, a driving means 102, a piezoelectric element control circuit 103, and a control signal line 104. The data recording/reproduction means 101 is provided with a laser beam emission/reception means 105 for recording or reproducing data in/from a disk type recording medium 111 that rotates about an axis 110, a concave reflection mirror 106, and piezoelectric elements 107 and 108. The internal structure of the laser beam emission/reception means 105 is identical to that of the laser beam emission/reception means 8 according to the first embodiment shown in FIG. 5.

The concave reflection mirror 106 is a deformable concave mirror that reflects a laser beam 109 emitted from the laser beam emission/reception means 105 so that the laser beam 109 is focused on the recording medium 111, or reflects the laser beam 109 reflected at the recording medium 111 so that the laser beam 109 is input to the laser beam emission/reception means 105. The concave reflection mirror 106 is put between the piezoelectric elements 107 and 108. The piezoelectric elements 107 and 108 are deformed with a voltage applied thereto, whereby the concave reflection mirror 106 is deformed. The piezoelectric element control circuit 103 applies a voltage to the piezoelectric elements 107 and 108 through the control signal line 104, and varies the voltage to control the focal length of the concave reflection mirror 106 in the focusing direction, and the focal direction in the tracking direction.

Next, the operation of the optical pickup device 150 according to the fifth embodiment will be described. The laser beam 109 emitted from the laser beam emission/reception means 105 en is reflected at the concave reflection mirror 106, and focused on the recording medium 111. Then, the laser beam 109 is reflected at the recording medium 111 according to the condition of the recording track on the recording medium 111, and the reflected laser beam is received by the laser beam emission/reception means 105. In this way, the optical pickup device 150 can read a signal on the recording medium 111. Likewise, it can write data in the recording medium 111.

Next, a description will be given of the operation to control the focus of the laser beam 109 onto the recording medium 111 when reading or writing data from/into the recording medium 111. The optical pickup device 150 of this fifth embodiment is provided with no object lens. Further, fine-adjustment of the focus of the laser beam 109 is carried out by the piezoelectric element control circuit 103 that controls the voltage applied to the two piezoelectric elements 107 and 108 to deform the concave reflection mirror 106.

Figure 9:
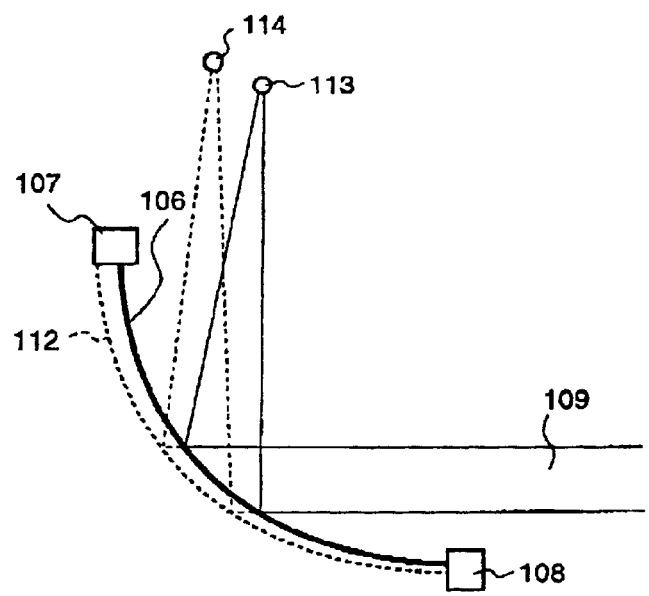
FIG. 9 is a diagram for explaining a change in focus position according to the fifth embodiment.

FIG. 9 is a diagram for explaining deformation of the concave reflection mirror 106 by the piezoelectric elements 107 and 108. In order to change the position of the focus of the laser beam 109, the piezoelectric element control circuit 103 varies the voltage applied to the piezoelectric elements 107 and 108 to deform the piezoelectric elements 107 and 108. The deformation of the piezoelectric elements 107 and 108 applies a force to the concave reflection mirror 106, whereby the concave reflection mirror 106 is deformed so that it has the shape shown by 112. Thereby, the focus of the laser beam 109 shift from the position 113 to the position 114. In this way, the focal length of the reflected laser beam 109 in the focusing direction and the focal direction of the laser beam 109 in the tracking direction are electrically controlled by controlling the shape of the concave reflection mirror 106 with the piezoelectric element control circuit 103, whereby the laser beam 109 is focused on the recording medium 111.

As described above, the optical pickup device 150 according to the fifth embodiment is provided with the concave reflection mirror 106 as a deformable concave mirror, the piezoelectric elements 107 and 108 that deform the concave reflection mirror 106 when a voltage is applied thereto, and the piezoelectric element control circuit 103 that controls deformation of the concave reflection mirror 106 by applying a voltage to the piezoelectric elements 107 and 108. Therefore, the laser beam 109 can be focused on the recording medium 111, and the position of the focus can be finely adjusted in the focusing direction and the tracking direction, without using an object lens, an object lens holder, an object lens adjustment means, and a tracking direction fine-adjustment means. Accordingly, it is not necessary to provide the data recording/reproduction means 101 with an object lens, an object lens holder, an object lens adjustment means, and a tracking direction file-adjustment means and, further, the piezoelectric element control circuit 103 can be disposed outside the data recording/reproduction means 101, whereby the weight of the data recording/reproduction means 101 is reduced. This weight reduction of the data recording/reproduction means 101 leads to weight reduction of the part to be driven by the driving means 102, resulting in reduced power consumption and high-speed operation.

Further, since fine-adjustment of the focus in the focusing direction and the tracking direction is carried out by applying a voltage from the piezoelectric element control circuit 103 to the piezoelectric elements 107 and 108, the mechanical driving system such as a focus position rine-adjustment means is reduced, resulting in high-speed adjustment of the focus position, and reduced power consumption.

While in this fifth embodiment two piezoelectric elements 107 and 108 are disposed surrounding the concave reflection mirror 106, this is merely an example, more than two piezoelectric elements may be used to deform the concave reflection mirror 106.

[Embodiment 6]

Figure 10:
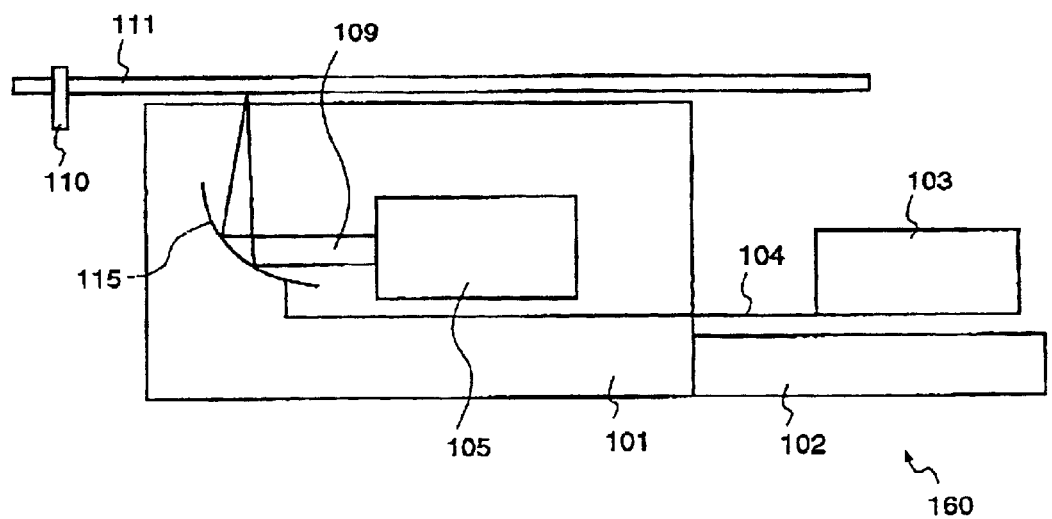
FIG. 10 is a schematic diagram illustrating an optical pickup device according to a sixth embodiment of the present invention.

FIG. 10 is a schematic diagram illustrating the structure of an optical pickup device 160 according to a sixth embodiment of the present invention. The optical pickup device 160 is provided with a data recording/reproduction means 101, a driving means 102, a piezoelectric element control circuit 103, and a control signal line 104. The data recording/reproduction means 101 is provided with a laser beam emission/reception means 105 and a concave reflection mirror 115. In FIG. 10, the same reference numerals as those shown in FIG. 8 denote the same or corresponding parts.

Figure 11:
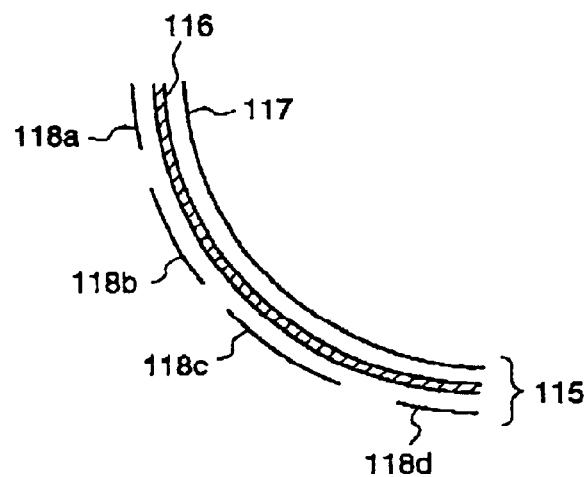
FIG. 11 is a diagram illustrating the structure of a concave reflection mirror according to the sixth embodiment.

FIG. 11 is a cross-sectional view of the concave reflection mirror 115. The concave reflection mirror 115 is a deformable concave mirror comprising a concave piezoelectric element 116, a conductive coating 117 applied to the inner surface of the concave piezoelectric element 116 to reflect a laser beam 109, and plural electrodes 118a~118h disposed on the outer surface of the concave piezoelectric element 116.

The concave piezoelectric element 116 is obtained by molding a piezoelectric material into a concave shape, and its shape varies when a voltage is applied thereto. The dielectric coating 117 has electrical conductivity, and reflectivity sufficient to reflect the laser beam. Preferably, silver is used as a material of the coating.

Figure 12:
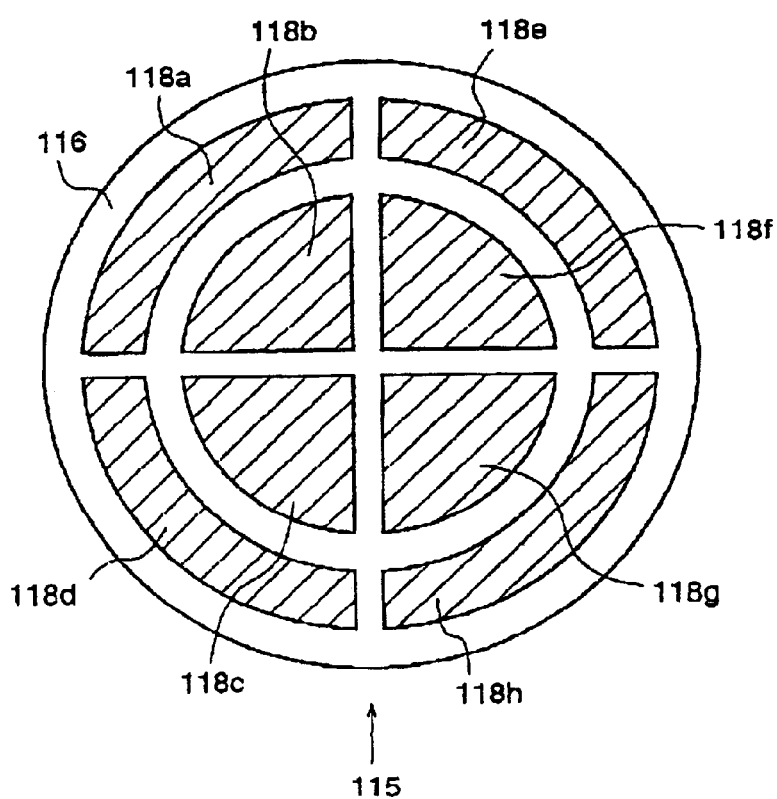
FIG. 12 is a diagram illustrating the outer surface of the concave reflection mirror according to the sixth embodiment.

FIG. 12 is a diagram illustrating the electrodes 118a~118h disposed on the outer surface of the concave reflection mirror 115. A voltage is independently applied between the conductive coating 117 and each of the respective electrodes 118a~118h, and the potential between the conductive coating 117 and each of the respective electrodes 118a~118h varies, whereby the shape of the concave piezoelectric element 116 varies. The piezoelectric element control circuit 103 controls the voltage applied between the conductive coating 117 and the electrodes an 118a~118h, thereby accurately controlling the focal length of the laser beam 109 in the focusing direction and the focal direction in the tracking direction.

Next, the operation of the optical pickup device 160 according to the sixth embodiment will be described. The operation of the optical pickup device 160 other than the part relating to control of the concave reflection mirror 115 to finely adjust the focus of the laser beam 109 is identical to that already described for the fifth embodiment and, therefore, repeated description is not necessary.

Figure 13:
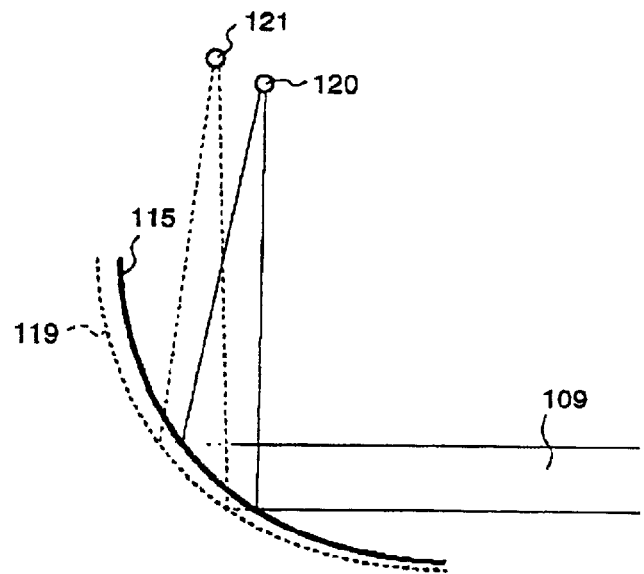
FIG. 13 is a diagram for explaining a change in focus position according to the sixth embodiment.

FIG. 13 is a diagram for explaining deformation of the concave piezoelectric element 116 of the concave reflection mirror 115. The piezoelectric element control circuit 103 independently varies the potential between the conductive coating 117 and each of the respective electrodes 118a~118h to precisely control the shape of the concave piezoelectric element 116, thereby varying the position of the focus of the laser beam 109. For example, when the piezoelectric element control circuit 103 applies a voltage between the conductive coating 117 and the plural electrodes 118a~118b of the concave reflection mirror 115, the concave reflection mirror 115 deforms to have the shape shown by 119, whereby the focus of the laser beam 109 shits from the position 120 to the position 121. Then, the piezoelectric element control circuit 103 electrically adjusts the focal length of the laser beam 109 in the focusing direction and the focal direction in the tracking direction.

As described above, in the optical pickup device 160 according to the sixth embodiment, since the concave reflection mirror 115 is composed of the concave piezoelectric element 116, the conductive coating 117, and the electrodes 118~118h, the concave reflection mirror 115 itself deforms, whereby the focal length of the laser beam 109 or focal direction can be controlled in the wider range, in addition to the same effects as achieved by the fifth embodiment. Accordingly, reliable reading and recording of data can be performed even when the recording medium 111 is deformed.

[Embodiment 7]

Figure 14:
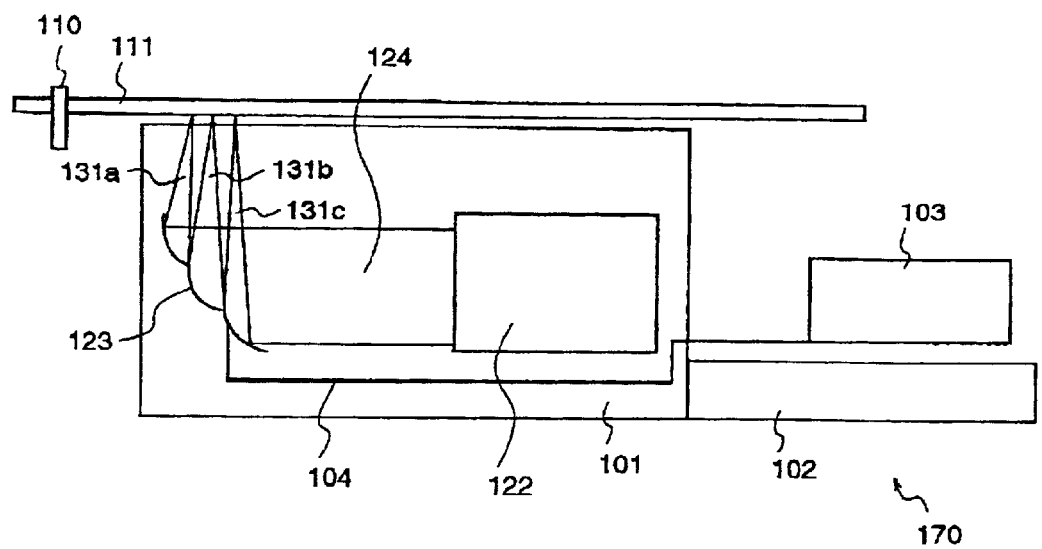
FIG. 14 is a schematic diagram illustrating an optical pickup device according to a seventh embodiment of the present invention.

FIG. 14 is a schematic diagram illustrating the structure of an optical pickup device 170 according to a seventh embodiment of the present invention. The optical pickup device 170 is provided with a data recording/reproduction means 101, a driving means 102, a piezoelectric element control circuit 103, and a control signal line 104. The data recording/reproduction means 101 is provided with a laser beam emission/reception means 112 and a concave reflection mirror 123. In FIG. 14, the same reference numerals as those shown in FIG. 8 denote the same parts.

The laser beam emission/reception means 122 emits a single wide laser beam 124 by using a combination of concave and convex lenses, and receives the laser beam 124 reflected at the recording medium 111.

The concave reflection mirror 123 is a deformable concave mirror comprising a concave piezoelectric element (not shown), a conductive coating applied to the inner surface of the concave piezoelectric element to reflect the laser beds 124, and plural electrodes disposed on the outer surface of the concave piezoelectric element, as described for the concave reflection mirror 115 according to the sixth embodiment.

Figure 15:
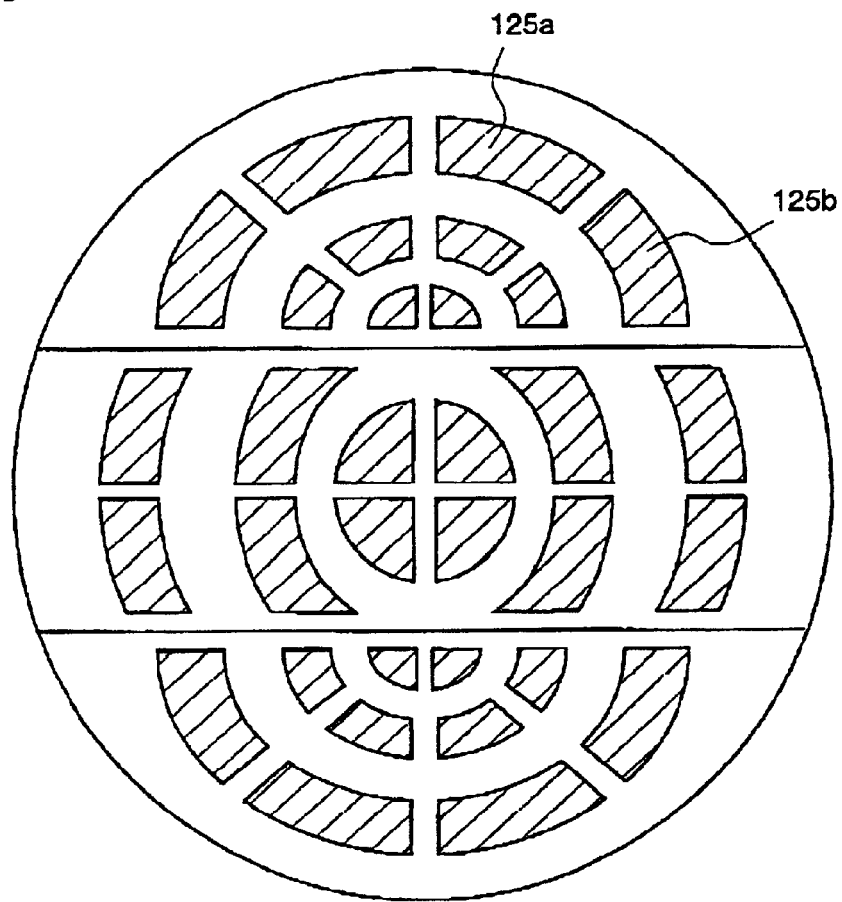
FIG. 15 is a diagram illustrating the outer surface of a concave reflection mirror according to the seventh embodiment.

FIG. 15 is a diagram illustrating the electrodes disposed on the outer surface of the concave reflection mirror 123. In FIG. 15, diagonally-shaded portions, for example, 125a and 125b, show the electrodes. As described with respect to the concave reflection mirror 115 according to the sixth embodiment, the concave reflection mirror 123 of this seventh embodiment is also deformed by a voltage applied between the conductive coating and the respective electrodes, whereby the position of the focus of the laser beam 124 is controlled. However, in contrast with the concave reflection mirror 11b of the sixth embodiment, the concave reflection mirror 123 forms plural focuses. To be specific, as shown in FIG. 14, the concave reflection mirror 123 splits the laser beam 124 into three laser beams 131a, 131b, and 131c. The positions of focuses of the respective laser beams 131a, 131b, and 131c can be finely adjusted by controlling the voltages applied to the piezoelectric elements of the concave mirror portions of the concave reflection mirror 123 corresponding to the respective laser beams 131a, 131b, and 131c.

Next, the operation of the optical pickup device 170 a according to the seventh embodiment will be described. The operation of the optical pickup device 170 other than the part relating to control of the concave reflection mirror 123 to finely adjust the focus of the laser beam is identical to that already described for the sixth embodiment except that the laser beam emission/reception means 122 is used instead of the laser beam emission/reception means 105 and, therefore, repeated description is not necessary.

Figure 16:
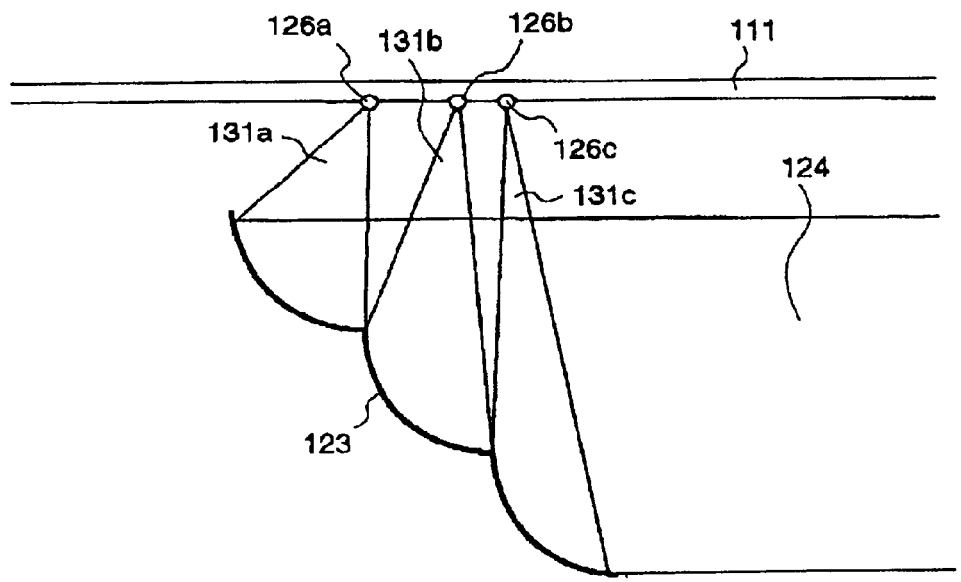
FIG. 16 is a diagram for explaining the positions of focuses according to the seventh embodiment.

Initially, a description will be given of the case where data are read from the recording tracks on the signal recording layer of the recording medium 111. FIG. 16 is a diagram for explaining reflection of the laser beam 124 at the concave reflection mirror 123. The laser beam 124 emitted from the laser beam emission/reception means 122 is reflected by the concave reflection mirror 123 so that it is split into three laser beams 131a, 131b, and 131c, and these laser beams are focused on positions 126a, 126b, and 126c on the recording medium 111, respectively. Further, as described with respect to the sixth embodiment, a voltage is applied between the conductive coating and the respective electrodes to deform the concave piezoelectric element (not shown), whereby the focal points 126a, 126b, and 126c are moved independently from each other. Therefore, the piezoelectric element control circuit 103 can control focusing so that the three local points 126a, 126b, and 126c are simultaneously positioned on the recording medium 111. Thereby, the optical pickup device 170 can read data simultaneously from the three recording tracks on the recording medium 111.

Figure 17:
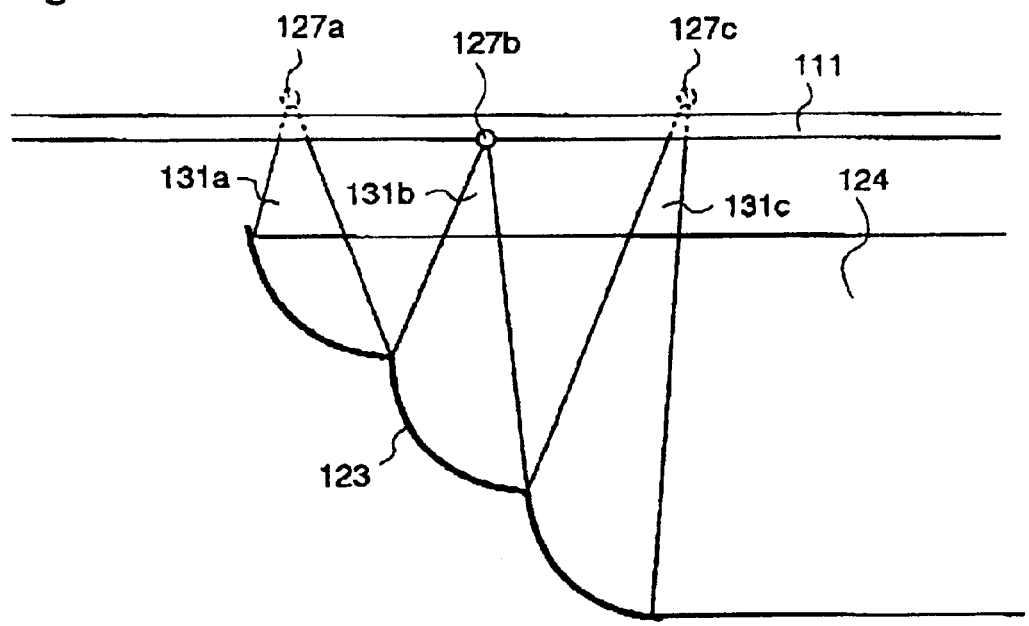
FIG. 17 is a diagram for explaining the positions of focuses according to the seventh embodiment.

Next, a description will be given of the case where data are written in the signal recording layer of the recording medium 111. FIG. 17 is a diagram for explaining reflection of the laser beam 124 by the concave reflection mirror 123 when data are written in the recording medium 111. When wiring data in the recording medium 111, among the plural laser beams 131a, 131b, and 131c from the concave reflection mirror 123, only the single laser beam 131b is focused on the recording medium 111. This is substantially identical to data writing into the recording medium 111 using a single-focus concave mirror. For example, as shown in FIG. 17, among the focuses 127a, 121b, and 127c of the three laser beams 131a, 131b, and 131c, only the single focus 127b is positioned on the signal recording layer of the recording medium 111 while the focuses 127a and 127c are not positioned on the signal recording layer of the recording medium 111. Power control of the laser beam required for data writing is performed by controlling the output level of the laser source, e.g., the laser diode.

As described above, the optical pickup device 170 according to this seventh embodiment is provided with the laser beam emission/reception means 122 that can emit the single wide laser beam 124, and the concave reflection mirror 123 that can split the single wide laser beam 124 into plural laser beams to bring the laser beams into focuses on plural recording tracks. Therefore, the optical pickup device 170 can simultaneously read is data from the plural recording tracks on the recording medium 111 without using an image sensor or the like. Further, since the optical pickup device 170 can form a single focus of a laser beam, it is applicable to data writing into a recordable medium such as a CD-R or the like. Further, since the single wide laser beam 124 is used, influences of the boundaries between the respective focuses of the concave reflection mirror 123 can be minimized. Moreover, since a diffraction grating or a birefringence material is not used to split the single wide laser beam 124 into plural laser beams, the cost of the optical pickup device is reduced.

Furthermore, the optical pickup device 170 can form plural focuses in a narrow range.

Figure 18:
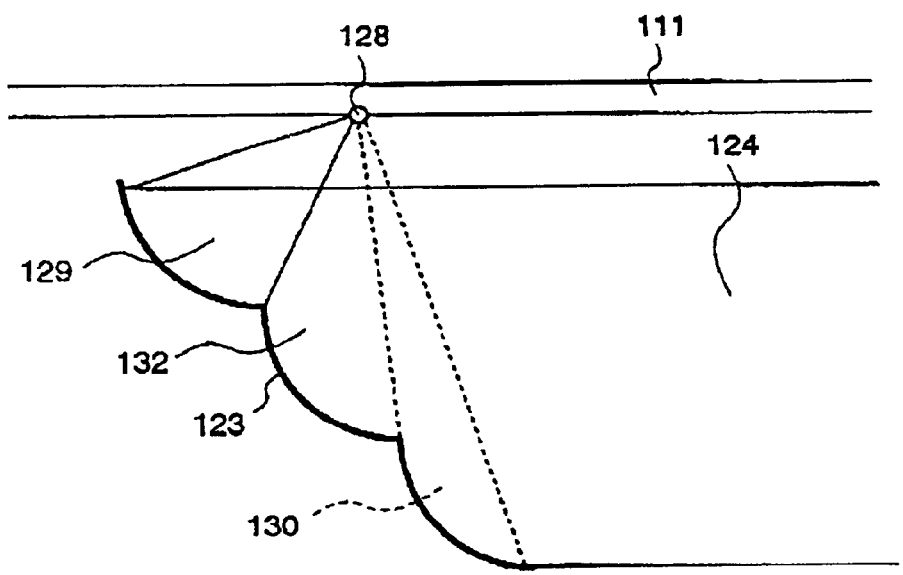
FIG. 18 is a diagram illustrating intersecting laser beams reflected at the concave reflection mirror according to the seventh embodiment.

FIG. 18 is a diagram for explaining reflection of the laser beam 124 by the concave reflection mirror 123. In the following description, "a concave mirror portion" means one of portions of the concave reflection mirror 123, which reflects a single laser beam (e.g., the laser beam 131a) among the laser beams into which the laser beam 124 is split by the concave reflection mirror 123.

The shape of the concave reflection mirror 123 is controlled by the piezoelectric element control circuit 103 as follows. The laser beam 129, which is a part of the laser beam 124 reflected at the upper concave mirror portion of the concave reflection mirror 123, is focused on a position 128 on the recording medium 111, and then reflected at the position 128 as a laser beam 130 to be applied to the lower concave mirror portion of the concave reflection mirror 123 and, thereafter, the laser beam 130 is reflected at the lower concave mirror portion to return into the laser beam emission/reception means 122. In this case, the laser beam 130 traveling from the lower concave mirror portion of the concave reflection mirror 123 toward the focus position 128 is reflected at the position 128 to return to the upper concave mirror portion of the concave reflection mirror 123 as the laser beam 129. Further, the laser beam 132 traveling from the center concave mirror portion of the concave reflection mirror 123 toward the focus position 128 is reflected at the position 128 to return to the center concave mirror portion of the concave reflection mirror 123 as the laser beam 132. Accordingly, in this case, the multi-focus concave reflection mirror 123 reflects the laser beam traveling toward the focus position 128 and the laser beam reflected at the focus position 128, at the positions that are linearly symmetrical with respect to the center line of the concave reflection mirror 123.

The center line of the concave reflection mirror 123 is a line that passes through the center of the concave reflection mirror 123 and is parallel to the boundaries of the respective concave mirror portions. Further, in the above description, for the sake of simplification, the focus positions of the laser beams that are reflected at the upper, center, and lower portions of the concave reflection mirror 123 and focused on the recording medium 111 are described as the focus position 128. However, actually the focus positions of the respective laser beams 129, 130, and 132 reflected at the concave reflection mirror 123 are different from each other by one or several tracks on the recording medium 111. That is, the focus position 128 shown in FIG. 18 indicates the three focuses that are gathered in a very narrow region. As described above, by making the laser beams reflected at the respective concave mirror portions intersect in the vicinity of the focus position 128, a lot of laser beams can be focused in a region that is far narrower than the distance between the respective concave mirror portions of the concave reflection mirror 123.

While in this seventh embodiment the concave reflection mirror 123 is divided in the horizontal direction, it may be divided in the vertical direction or in both of the horizontal and vertical directions. However, when using a multi-focus concave reflection mirror that is divided in both of the horizontal and vertical directions, the laser beam emitted from the laser beam emission/reception means 122 and the laser beam traveling toward the laser beam emission/reception means 122 are respectively reflected at positions that are point-symmetrical with respect to the center of the concave reflection mirror. For example, in the case of using a concave reflection mirror that is divided into three portions in each or the horizontal and vertical directions, when the laser beam emitted from the laser beam emission/reception means 122 is reflected at the lower-right portion of the concave reflection mirror, the laser beam is reflected at the signal recording layer of the recording medium 111 to return to the upper-left portion of the concave reflection mirror, and reflected at the upper-left portion to return into the laser beam emission/reception means 122.

While in this seventh embodiment the laser beam 124 is split into three laser beam by the concave reflection mirror 123, this is merely an example. The laser beam 124 may be split into two laser beams or more than three laser beams.

While in this seventh embodiment the laser beam reflected at the center concave mirror portion of the concave reflection mirror 123 is used as a laser beam for wiring data into the recording medium 111, this is merely an example. A laser beam reflected at any concave mirror portion may be used for data writing.

While in this seventh embodiment the concave reflection mirror 123 is composed of the concave piezoelectric element, the conductive coating, and the plural electrodes as in the sixth embodiment of the invention, the concave reflection mirror may be constituted such that plural piezoelectric elements are disposed on the periphery of the concave reflection mirror or at the boundaries of the respective concave mirror portions of the concave reflection mirror as in the fifth embodiment of the invention.

Furthermore, while in this seventh embodiment the laser beam 124 incident on the concave reflection mirror 123 is a single wide laser beam, this is merely an example. For example, when the concave reflection mirror is composed of three concave mirror portions, a single laser beam may be applied to each of the three mirror portions, i.e., three laser beams may be used.

[Embodiment 8]

Figure 19:
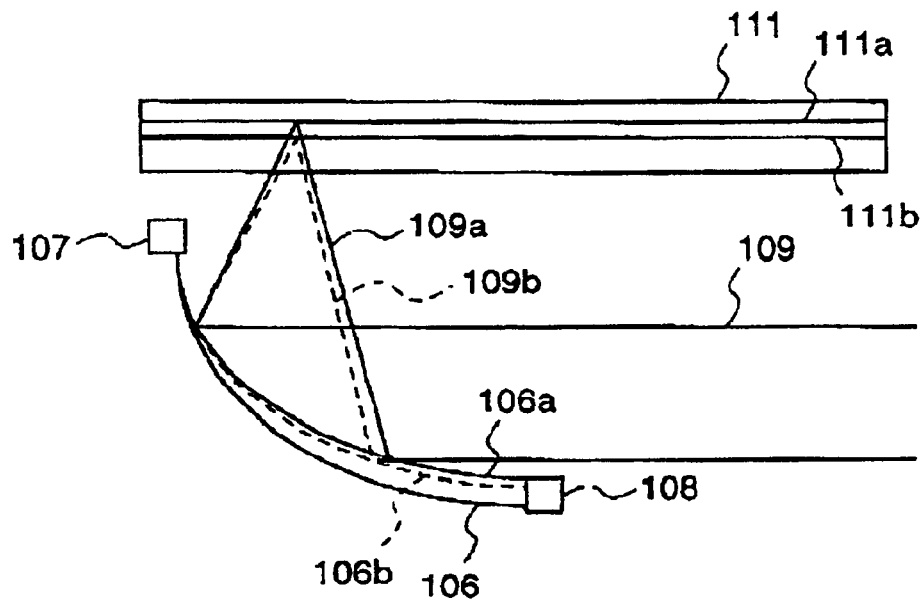
FIG. 19 is a schematic diagram illustrating the structure of an optical pickup device according to an eighth embodiment of the present invention.

FIG. 19 is a schematic diagram illustrating a main part of an optical pickup device according to an eighth embodiment of the present invention. The optical pickup device according to this eighth embodiment is different from the optical pickup device according to the fifth embodiment only in that the shape of the concave reflection mirror 106 is varied by controlling the piezoelectric elements 107 and 108 with the piezoelectric element control circuit 103 so that the laser beam 109 is focused on a data recording layer 111a for CD when the recording medium 111 is a CD, or on a data recording layer 111b for DVD when the recording medium 111 is a DVD. Reference numeral 106a shows the concave reflection mirror 106 that is deformed no that the reflected beam 109a is focused on the data recording layer 111a for CD. Reference numeral 106b shows the concave reflection mirror 106 that is deformed so that the reflected beam 109b is focused on the data recording layer 11b for DVD Next, the operation or the optical pickup device will be described. The operation of the optical pickup device other than the part relating to control of the concave reflection mirror 106 to adjust the focus of the laser beam 109 is identical to that described for the fifth embodiment and, therefore, repeated description is not necessary.

When the recording medium 111 is a CD, the piezoelectric element control circuit 103 varies the voltage applied to the piezoelectric elements 107 and 108 to deform the piezoelectric elements 107 and 108. The deformation of the piezoelectric elements 107 and 108 applies a force to the concave reflection mirror 106, whereby the concave reflection mirror 106 is deformed to the shape shown by 106a. The laser beam 109 reflected by the deformed concave reflection mirror 106a is focused on the data recording layer 111d for CD.

When the recording medium 111 is a DVD, the piezoelectric element control circuit 103 varies the voltage applied to the piezoelectric elements 108 and 108 to deform the piezoelectric elements 107 and 108. The deformation of the piezoelectric elements 107 and 108 applies a force to the concave reflection mirror 106, whereby the concave reflection mirror 106 is deformed so as to have the shape shown by 106b. The laser beam 109 reflected by the deformed concave reflection mirror 106b is focused on the data recording layer 111b for DVD.

The focus position when the concave reflection mirror 106 is not deformed may be set on either the data recording layer 111a for CD or the data recording layer 111b for DVD.

As described above, according to the eighth embodiment, since the laser beam can be focused on the data recording layer 111a for CD or the data recording layer 111b for DVD as desired by controlling the piezoelectric elements 107 and 108 with the piezoelectric element control circuit 103, it is not necessary to provide the data recording/reproduction means 101 with a double-focus object lens or an object lens driving mechanism, whereby the weight of the data recording/reproduction means 101 is reduced. Further, the weight reduction of the data recording/reproduction means 101 leads to weight reduction of the part to be driven by the driving means 102, resulting in reduced power consumption and high-speed operation.

[Embodiment 9]

Figure 20:
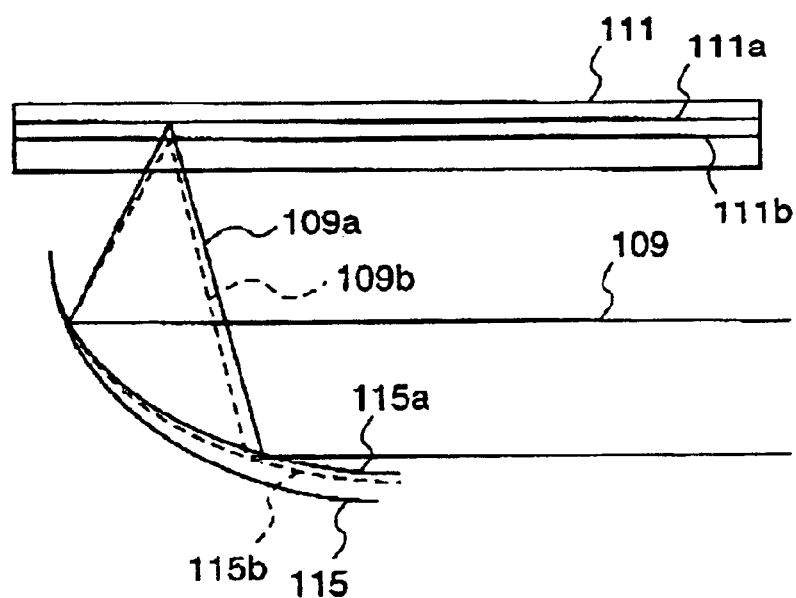
FIG. 20 is a schematic diagram illustrating the structure of an optical pickup device according to a ninth embodiment of the present invention.
Figure 21:
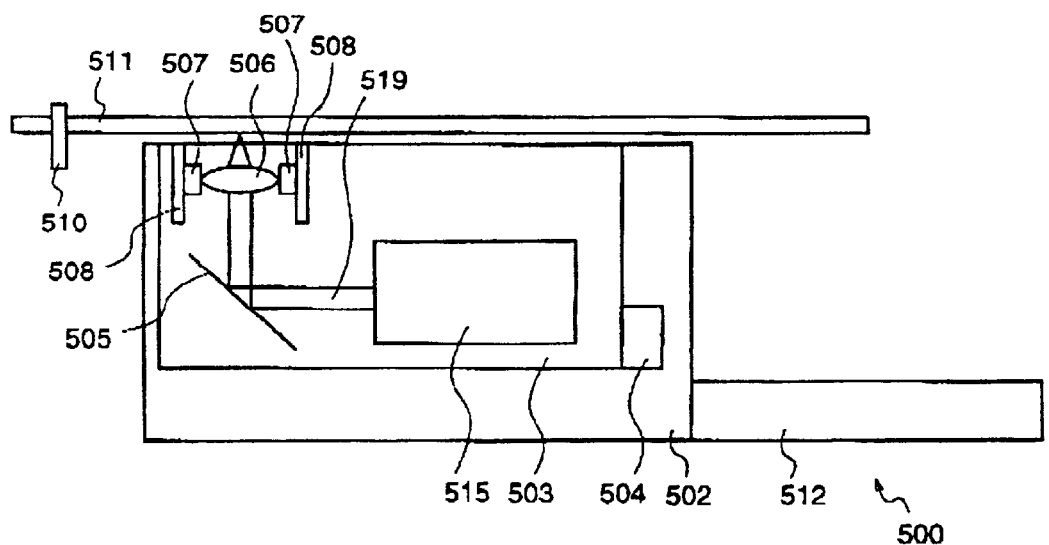
FIG. 21 is a schematic diagram illustrating the structure of a conventional optical pickup device.
Figure 22:
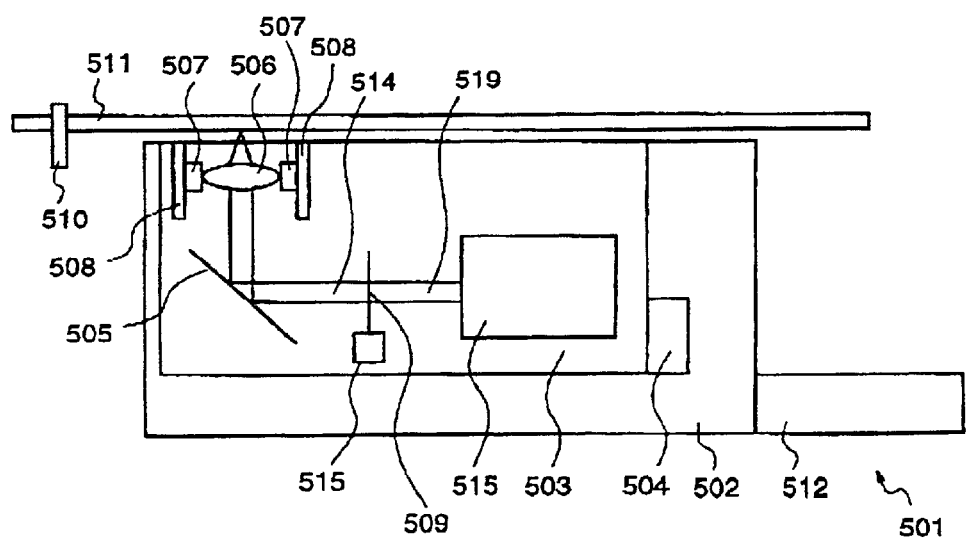
FIG. 22 is a schematic diagram illustrating the structure of another conventional optical pickup device.

FIG. 20 is a schematic diagram illustrating a main part of an optical pickup device according to a ninth embodiment of the present invention. The optical pickup device according to this ninth embodiment is different from the optical pickup device according to the sixth embodiment only in that the shape of the concave reflection mirror 115 is varied by the piezoelectric element control means 103 so that the laser beam 109 is focused on the data recording layer 111a for CD when the recording medium 111 is a CD, or on the data recording layer 111b for DVD when the recording medium 111 is a DVD. Reference numeral 115a shows the concave reflection mirror 115 that is deformed so that the reflected beam 109a is focused on the data recording layer 111a for CD. Reference numeral 115b shows the concave reflection mirror 115 that is deformed so that the reflected beam 109b is focused on the data recording layer 111b for DVD.

Next, the operation of the optical pickup device will be described. Since the operation of the optical pickup device other than the part relating to control of the concave reflection mirror 115 to finely adjust the focus of the laser beam 109 is identical to that described for the sixth embodiment, repeated description is not necessary.

When the recording medium 111 is a CD, the piezoelectric element control circuit 103 varies the voltage applied to the electrodes disposed on the outer surface of the concave reflection mirror 115 to deform the concave reflection mirror 115 to the shape shown by 115a. Thereby, the laser beam 109a reflected at the concave reflection mirror 115a is focused on the data recording layer 111a for CD.

When the recording medium 111 is a DVD, the piezoelectric element control circuit 103 varies the voltage applied to the electrodes disposed on the outer surface of the concave reflection mirror 115 to deform the concave reflection mirror 115 to the shape shown by 115b. Thereby, the laser beam 109b reflected at the concave reflection mirror 115b is focused on the data recording layer 111b for DVD.

The focus of the laser beam 109 when the concave reflection mirror 115 is not deformed may be positioned on either the data recording layer 111a for CD or the data recording layer 111b for DVD.

As described above, according to the ninth embodiment, since the laser beam can be focused on either the data recording layer 111a for CD or the data recording layer 111b for DVD as desired by controlling the concave reflection mirror 115 with the piezoelectric element control circuit 103, it is not necessary to provide the data recording/reproduction means 101 with a double-focus object lens or an object lens driving mechanism, whereby the weight of the data recording/reproduction means 101 is reduced. Further, the weight reduction of the data recording/reproduction means 101 leads to weight reduction of the part to be driven by the driving means 102, resulting in reduced power consumption and high-speed operation.

The optical pickup device according to the eighth and ninth embodiments may be provided with, as the laser beam emission/reception means 8, plural laser diodes that can output laser beams of different wavelengths, and a laser beam selected from the plural laser beams of different wavelengths may be used as the laser beam 109. Also in this case, the same effects as those mentioned for the eighth or ninth embodiment are achieved. For example, when the recording medium is a CD or a DVD, a laser beam for CD or a laser beam for DVD can be applied to the data recording layer corresponding to the recording medium, respectively.

While in the eighth and ninth embodiments the optical pickup device applicable to a CD and a DVD as recording mediums is described, this is merely an example. The present invention is applicable to any optical pickup device that is used for plural recording mediums having data recording layers of different depth positions. Also in this case, the same effects as described for the eighth and ninth embodiment are achieved.

While in the fifth to ninth embodiments the shape of the concave reflection mirror 106, 115, or 123 is nearly round, this is merely an example. The shape of the concave reflection mirror may be rectangle or oval.

While in the sixth, seventh, and ninth embodiments the plural electrodes are radially disposed on the concave reflection mirror 115 or 123, these electrodes may be arranged in a grid pattern.

In the sixth, seventh, and ninth embodiments, the concave piezoelectric element may be made of a single piezoelectric element, or it may be formed by attaching plural piezoelectric elements in a mosaic pattern.

As described above, the optical pickup device according to, the present invention is applicable to apparatuses for recording or reproducing data on/from optical disks such as CD, CD-R, CD-RW, DVD, DVD-R, etc., and especially, the optical pickup device is suitable for an apparatus for recording or reproducing data on/from plural optical disks based on different standards and having data recording layers of different depth positions.

What is claimed is:

1. An optical pickup device for irradiating a data recording layer of a disk type data recording medium with a laser beam emitted from a light source, said optical pickup device comprising:

an object lens comprising a transparent piezoelectric element that deforms when a voltage is applied, and condensing the laser beam emitted from the light source to apply it onto the data recording layer; and control means for controlling the position of focus of the laser beam by applying a voltage to the object lens to deform the object lens.

2. An optical pickup device as defined in claim 1, wherein said control means controls the position of focus of the laser beam by applying a voltage to the object lens asymmetrically with respect to the center of the object lens so as to deform the object lens asymmetrically.

3. An optical pickup device as defined in claim 1, wherein a plurality of transparent electrodes are disposed on the surface of the object lens, and the control means applies a voltage to the object lens through the respective transparent elements.

4. An optical pickup device as defined in claim 1, wherein said control means controls the focal length of the laser beam in the focusing direction.

5. An optical pickup device as defined in claim 1, wherein said control means controls the focal direction of the laser beam in the tracking direction.

6. An optical pickup device as defined in claim 1 wherein, said control means controls, simultaneously, the focal length of the laser beam in the focusing direction, and the focal direction of the laser beam in the tracking direction.

7. An optical pickup device as defined in claim 1 wherein, when a plurality of disk type data recording mediums having data recording layers of different depth positions are employed, said control means controls the position of focus of the laser beam by deforming the object lens so that the laser beam is focused on each of the data recording layers.

8. An optical pickup device as defined in claim 7, wherein the plural disk type data recording mediums are DVD and CD.

* * * * *